United States Patent [19]

Wilkinson et al.

[11] Patent Number: 4,675,735
[45] Date of Patent: Jun. 23, 1987

[54] ERROR CONCEALMENT IN DIGITAL TELEVISION SIGNALS

[75] Inventors: James H. Wilkinson, Tadley, United Kingdom; Peter C. Boreland, Waterbury, Conn.

[73] Assignee: Sony Corporation, Tokyo, Japan

[21] Appl. No.: 772,419

[22] Filed: Sep. 4, 1985

[30] Foreign Application Priority Data

Sep. 18, 1984 [GB] United Kingdom ............... 8423546

[51] Int. Cl.⁴ ............................................. H04N 5/14
[52] U.S. Cl. .................................. 358/160; 358/163; 358/21 R
[58] Field of Search ................. 358/21 R, 36, 37, 167, 358/160, 166, 163, 314, 336; 382/51; 371/31, 65

[56] References Cited

U.S. PATENT DOCUMENTS

| | | | |
|---|---|---|---|
| 4,381,519 | 9/1981 | Wilkinson et al. | 358/21 R |
| 4,464,686 | 8/1984 | Reitmeier | 358/36 |
| 4,470,065 | 9/1984 | Reitmeier | 358/21 R |
| 4,517,600 | 5/1985 | Reitmeier | 358/163 |
| 4,573,070 | 2/1986 | Cooper | 358/167 |
| 4,586,082 | 4/1986 | Wilkinson | 358/163 |

Primary Examiner—James J. Groody
Assistant Examiner—David E. Harvey
Attorney, Agent, or Firm—Lewis H. Eslinger; Alvin Sinderbrand

[57] ABSTRACT

Concealing errors in a digital television signal, which has a plurality of component sample values corresponding respectively to sample positions along a horizontal scan line of a television picture made up of a plurality of scan lines, in respect of each sample value which is in error, by calculating a first concealment accuracy by determining the difference between two immediately adjacent sample values both in the scan line immediately preceding or following the scan line which the error sample is in, and one of which sample values is immediately adjacent to the error sample, calculating a second concealment accuracy by determining the difference between two immediately adjacent sample values both in the vertical line immediately preceding or following the vertical line which the error sample is in, and one of which sample values is immediately adjacent to the error sample, selecting from the available concealment accuracies a preferred direction of the television picture for concealing the error sample, calculating a corrected value of the error sample using available sample values disposed along the preferred direction, and substituting the corrected sample value for the error sample so as to conceal the error.

10 Claims, 8 Drawing Figures television signal and in accordance with the present invention.

DESCRIPTION OF THE PREFERRED EMBODIMENTS

Before describing an embodiment of the invention, and to assist understanding of the embodiment, further reference will first be made to the problems mentioned above.

Referring to FIG. 1, this shows part of the television raster of one field, and in particular parts of three consecutive horizontal scan lines labelled line n−1, line n and line n+1. The luminance sample positions are disposed at regular intervals along each of the lines, the intervals corresponding to a sampling frequency of say 13.5 MHz, and the sample positions being aligned in the vertical direction. In other words, the field is orthogonally sampled, although this is not essential to the invention, it being sufficient that the sample positions are substantially aligned in vertical lines. Reading from the left, consecutive sample positions in each line are labelled S−3, S−2, S−1, S0, S1, S2 and S3. Using this notation, any sample position in the matrix can be designated by the line and the sample number, and for the purpose of this discussion it is assumed that the sample position at which there is an error sample signal requiring concealment is in line n at position S0, this being designed n, S0.

As disclosed in our above-mentioned patents, a corrected value for the sample position n, S0 could be estimated in one of four different ways. Firstly, the average could be taken of the two sample values in line n adjacent to and on each side of the sample position n, S0. Secondly, the average could be taken of the two sample values in line n−1 and line n+1 adjacent to and vertically above and below the sample position n, S0. Thirdly, the average could be taken of the two sample values in line n−1 and line n+1 and on either side of the sample position n, S0 along the positive diagonal direction. Fourthly, the average could be taken of the two sample values in line n−1 and line n+1 adjacent to and on either side of the sample position n, S0 and along the negative diagonal direction. These four directions are indicated by the arrows A, B, C and D respectively.

Each of these possibilities may be thought of as an algorithm for calculating a corrected value, and it will be appreciated that it is likely that one of these algorithms will give a better result than any of the others. The direction to be used is therefore selected by testing each algorithm using known sample values to see which gives the best result. A corrected value derived using the direction corresponding to that preferred algorithm is then used when substituting a corrected value sample.

As a further refinement, the results derived from the respective algorithms can be weighted. In other words, a value can be placed on the likely accuracy of the results obtained. This is necessary because the distance between adjacent sample positions is less in the horizontal direction than in the vertical direction, the difference amounting to a factor of approximately 1.75. For this reason, the algorithm using the horizontal direction is in fact most likely to give the nearest result, with the algorithm for the vertical direction being next best, and the two algorithms for the diagonal directions being the next best.

The four algorithms referred to above will now be specified in mathematical terms. Thus, the decision as to which concealment direction to use is made by investigating the adjacent sample values and obtaining the concealment accuracy for each direction. If the concealment accuracy is H for the horizontal direction, V for the vertical direction, $D^+$ for the positive diagonal direction and $D^-$ for the negative diagonal direction, then these concealment accuracies can be defined as follows:

$$H = \tfrac{1}{2}|\tfrac{1}{2}\{(n-1), S-1+(n-1), S1\}-(n-1), S0| + \tfrac{1}{2}|\tfrac{1}{2}\{(n+1), S-1+(n+1) S1\}-(n+1), S0| \qquad (1)$$

that is to say, the concealment accuracy H equals the average of the horizontal concealment accuracy from the horizontal line immediately above and the horizontal line immediately below the horizontal line containing the error sample.

Likewise:

$$V = \tfrac{1}{2}|\tfrac{1}{2}\{(n-1), S-1+(n+1), S-1\}-n, S-1| + \tfrac{1}{2}|\tfrac{1}{2}\{(n-1), S1+(n+1), S1\}-n, S1\} \qquad (2)$$

$$D^+ = \tfrac{1}{2}|\tfrac{1}{2}\{(n-1), S0+(n+1), S-2\}-n, S-1| + \tfrac{1}{2}|\tfrac{1}{2}\{(n-1), S2+(n+1), S0\}-n, S1| \qquad (4)$$

$$D^- = \tfrac{1}{2}|\tfrac{1}{2}\{(n-1), S-2+(n+1), S0\}-n, S-1| + \tfrac{1}{2}|\tfrac{1}{2}\{(n-1), S0+(n+1), S2\}-n, S1| \qquad (3)$$

These four values H, V, $D^+$ and $D^-$ represent the accuracy of concealment for the sample values most closely connected with the error sample. Preferably these concealment accuracies H, V, $D^+$ and $D^-$ are each assigned a weighting coefficient to take account of the unequal spacings of the horizontal, vertical and diagonal samples. The smallest value is then used to select the direction of concealment.

One of the problems that can arise with this method, and which was referred to briefly above, will now be further described with reference to FIG. 2. This again shows part of the raster of one field, and in this case each sample position is marked by a cross. It is possible during severe error conditions for a high proportion of the sample values to be in error. A 25% error rate is not unusual, and may arise, for example, where due to dropout there is no output from one of the heads of a four-head digital VTR. It will be usual for the error samples in such a case to be symetrically distributed throughout the field, so that every fourth sample value is in error, as indicated by the crosses enclosed in boxes in FIG. 2.

If now FIG. 2 is compared with FIG. 1, it will be seen that due to the error samples it is not possible to determine the concealment accuracies $D^+$ and $D^-$ corresponding to the diagonal directions C and D, because each of the two terms bounded by the magnitude signs in the relevant algorithm (3) or (4) involves use of an error sample. It is to be noted that it is merely the calculation of the concealment accuracies which has failed, and it is clear from FIG. 2 that there are non-error samples available for actually effecting concealment in the positive and negative diagonal directions C and D.

The other problem referred to briefly above will now be further described with reference to FIG. 3. The specifications of the abovementioned patents refer to the frequency response of this form of error concealment, and this second problem arises in this area of frequency response. It is to be remembered that when a television signal is orthogonally sampled, the sample positions along each horizontal scan line have a predetermined phase. The frequency response is the average

ERROR CONCEALMENT IN DIGITAL TELEVISION SIGNALS

BACKGROUND OF THE INVENTION

1. Field of the Invention

This invention relates to error concealment in digital television signals.

2. Description of the Prior Art

If errors occur in the handling of digital television signals, for example due to noise or drop-out occurring in a digital video tape recorder (VTR), the digital signals are lost or corrupted, and then the reformed analog television signal does not correspond exactly to the original analog television signal, and a resulting picture is degraded.

There are two main approaches to dealing with errors in digital television signals. The first approach is correction, which involves the production and use of additional data signals purely for the purpose of error detection and correction, these additional data signals otherwise being redundant. While correction provides good results, it cannot generally be used as the sole means of dealing with errors, because a comprehensive correction capability would require an excessive amount of additional data which might overload the data handling paths or raise the data rate to an unacceptable level. The second approach, with which the present invention is more particularly concerned, is concealment. This comprises the replacement of lost or corrupted data signals by data signals generated using available uncorrupted data signals. This method relies largely for accuracy on the strong correlation that exists in a television signal.

In our UK Pat. No. 2,073,534 and the corresponding European Pat. No. 0,037,212, we have disclosed a method of error concealment which comprises selecting from a plurality of algorithms a preferred algorithm for calculating a corrected value for use in concealment of an error sample, calculating a corrected value for the error sample using the preferred algorithm, and replacing the error sample by the corrected value sample. This method works well in most situations, but we have found that there are certain error situations and also certain signal frequency conditions which result in problems in selecting the preferred algorithm. These problems will be discussed in more detail below.

SUMMARY OF THE INVENTION

One object of the present invention is to provide a method of concealing errors in a digital television signal in which these problems are reduced.

Another object of the present invention is to provide a method of concealing errors in a digital television signal which is effective when there is a high error rate.

Another object of the present invention is to provide a method of concealing errors in a digital television signal which takes account of the frequency response of the sampled input television signal.

According to the present invention there is provided a method of concealing errors in a digital television signal, which television signal comprises a plurality of component sample values corresponding respectively to sample positions along a horizontal scan line of a television picture made up of a plurality of said lines, the method comprising, in respect of each said sample value which is in error:

calculating a first concealment accuracy by determining the difference between two immediately adjacent sample values both in the said line immediately preceding or following the said line which said error sample is in, and one of which sample values is immediately adjacent to said error sample;

calculating a second concealment accuracy by determining the difference between two immediately adjacent sample values both in the vertical line immediately preceding or following the vertical line which said error sample is in, and one of which sample values is immediately adjacent to said error sample;

selecting from the available said concealment accuracies a preferred direction of said television picture for concealing said error sample; calculating a corrected value of said error sample using available sample values disposed along said preferred direction; and substituting said corrected sample value for said error sample so as to conceal the error.

According to the present invention there is also provided apparatus for concealing errors in a digital television signal, which television signal comprises a plurality of component sample values corresponding respectively to sample positions along a horizontal scan line of a television picture made up of a plurality of said lines, the apparatus comprising:

means for calculating a first concealment accuracy by determining the difference between two immediately adjacent sample values both in the said line immediately preceding or following the said line which an error sample is in, and one of which sample values is immediately adjacent to said error sample;

means for calculating a second concealment accuracy by determining the difference between two immediately adjacent sample values both in the vertical line immediately preceding or following the vertical line which said error sample is in, and one of which sample values is immediately adjacent to said error sample;

means for selecting from the available said concealment accuracies a preferred direction of said television picture for concealing said error sample;

means for calculating a corrected value of said error sample using available sample values disposed along said preferred direction; and means for substituting said corrected sample value for said error sample so as to conceal the error.

The above, and other objects, features and advantages of this invention will be apparent from the following detailed description of illustrative embodiments which is to be read in connection with the accompanying drawings.

BRIEF DESCRIPTION OF THE DRAWINGS

FIG. 3 shows the case where successive sample positions differ in phase by $\pi/2$, and using the designation plus, minus and zero for the phases at respective sample positions as indicated by the waveform in FIG. 3, it will be seen that it may not be possible to determine the concealment accuracies H, V, D+ and D− because terms in the relevant algorithm disappear when the phases are considered. Thus a particular phase of the signal gives rise to nulls at most or all of the sample positions which are to be used in calculating the concealment accuracies H, V, D+ and D−. In these circumstances the method fails to select a preferred concealment direction correctly, even although there are no other error samples in the region of the error sample to be corrected.

This problem can be demonstrated, for example, by using a zone plate. A zone plate is a television picture comprising concentric circles which move outwards from the centre of the screen, increasing in diameter and speed, and hence in signal frequency, as they approach the periphery of the screen. With such a zone plate, it is found that the problem arises on each of the two diagonals of the screen, about midway between the centre and the corner of the screen.

In the method according to the present invention, both these problems are overcome by modifying the way in which the concealment accuracies H, V, D+ and D− are calculated.

Figure 1:
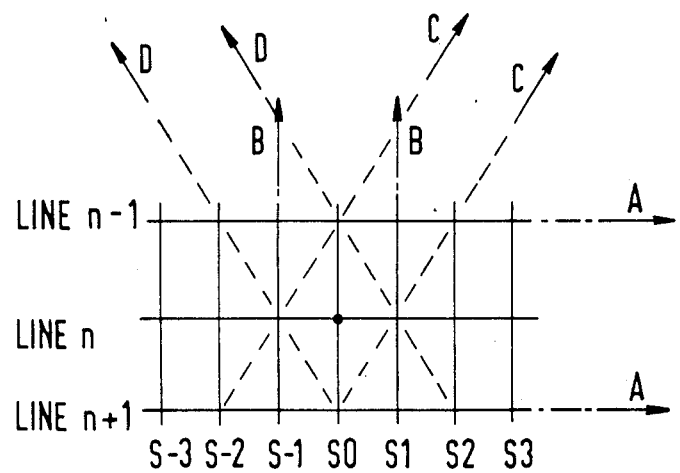
FIG. 1 shows a matrix of sample positions in a television picture.
Figure 2:
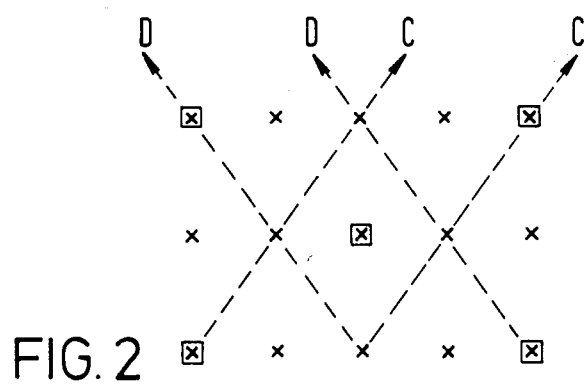
FIG. 2 shows a further matrix of sample positions in a television picture.
Figure 3:
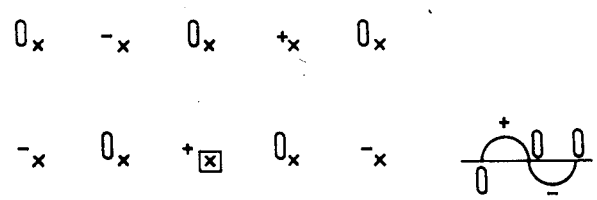
FIG. 3 shows a further matrix of sample positions in a television picture.
Figure 4A:
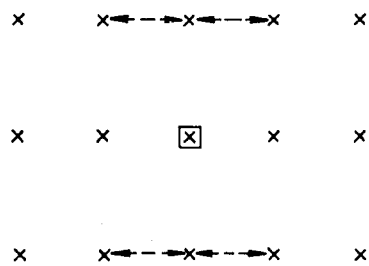
FIGS. 4A to 4D show still further matrices of sample positions in a television picture.

FIG. 4A indicates the modified calculation for the horizontal direction A. For the calculation the same sample values as in the algorithm (1) are used, but the sample values are subtracted from one another in pairs as indicated by the dotted lines in FIG. 4A.

Figure 4B:
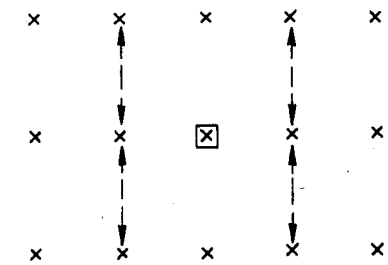

FIG. 4B indicates the similarly modified calculation for the concealment accuracy in the vertical direction V.

Figure 4C:
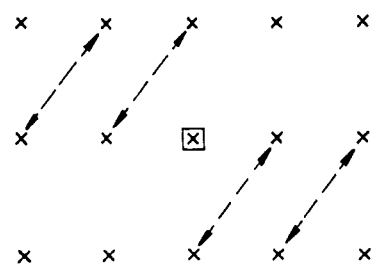

FIG. 4C indicates the modified calculation for the positive diagonal direction C. For the calculation, each of the four sample values nearest to the error sample in the same horizontal line are used. The first two are subtracted from the two sample values in the preceding horizontal line and located in the respective positive diagonal direction, and the two succeeding the error sample have subtracted from them the two sample values in the succeeding horizontal line located in the respective positive diagonal direction.

Figure 4D:
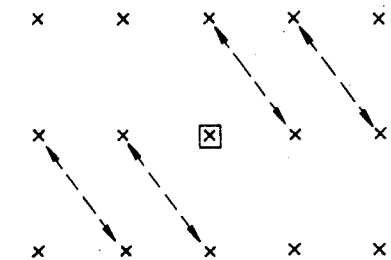

FIG. 4D indicates the similarly modified calculation for the concealment accuracy D− in the negative diagonal direction D.

Written in the form of algorithms the concealment accuracies H, V, D+ and D− at (3) and (4) above are modified as follows:

$$H = \tfrac{1}{4}\{|(n-1), S-1-(n-1), S0| + |(n-1), S0-(n-1), S1| + |(n+1), S-1-(n+1), S0| + |(n+1), S0-(n+1), S1|\} \quad (5)$$

$$V = \tfrac{1}{4}\{|(n-1), S-1-n, S-1| + |n, S-1-(n+1), S-1| + |(n-1), S1-n, S1| + |n, S1-(n+1), S1|\} \quad (6)$$

$$D^+ = \tfrac{1}{4}\{|(n-1), S-1-n, S-2| + |(n-1), S0-n, S-1| + |n, S1-(n+1), S0| + |n, S2-(n+1), S1|\} \quad (7)$$

$$D^- = \tfrac{1}{4}\{|(n-1), S0-n, S1| + |(n-1), S1-n, S2| + |n, S-2-(n+1), S-1| + |n, S-1-(n+1), S0|\} \quad (8)$$

The method has been described as applied to the luminance channel, that is to say concealment of errors occuring in luminance sample values. It is also necessary to consider the colour difference channels, and here two possibilities arise.

Firstly, each colour difference channel can be provided with a separate concealment selection arrangement independent of the arrangement for the luminance channel.

Secondly, because the first solution referred to above increases the amount of hardware required by approximately three, an alternative method which economizes on the amount of hardware required makes use of the fact that the chrominance information is related to the luminance information. That is, where a chrominance edge exists, so usually does a luminance edge. Based on this assumption it is possible to select the direction of colour difference concealment to be the same as that selected for luminance concealment. However, because the chrominance samples occur at only one half the frequency of the luminance samples along each horizontal line, a different set of weighting coefficients has to be used, these being optimized to the chrominance bandwidths.

Figure 5:
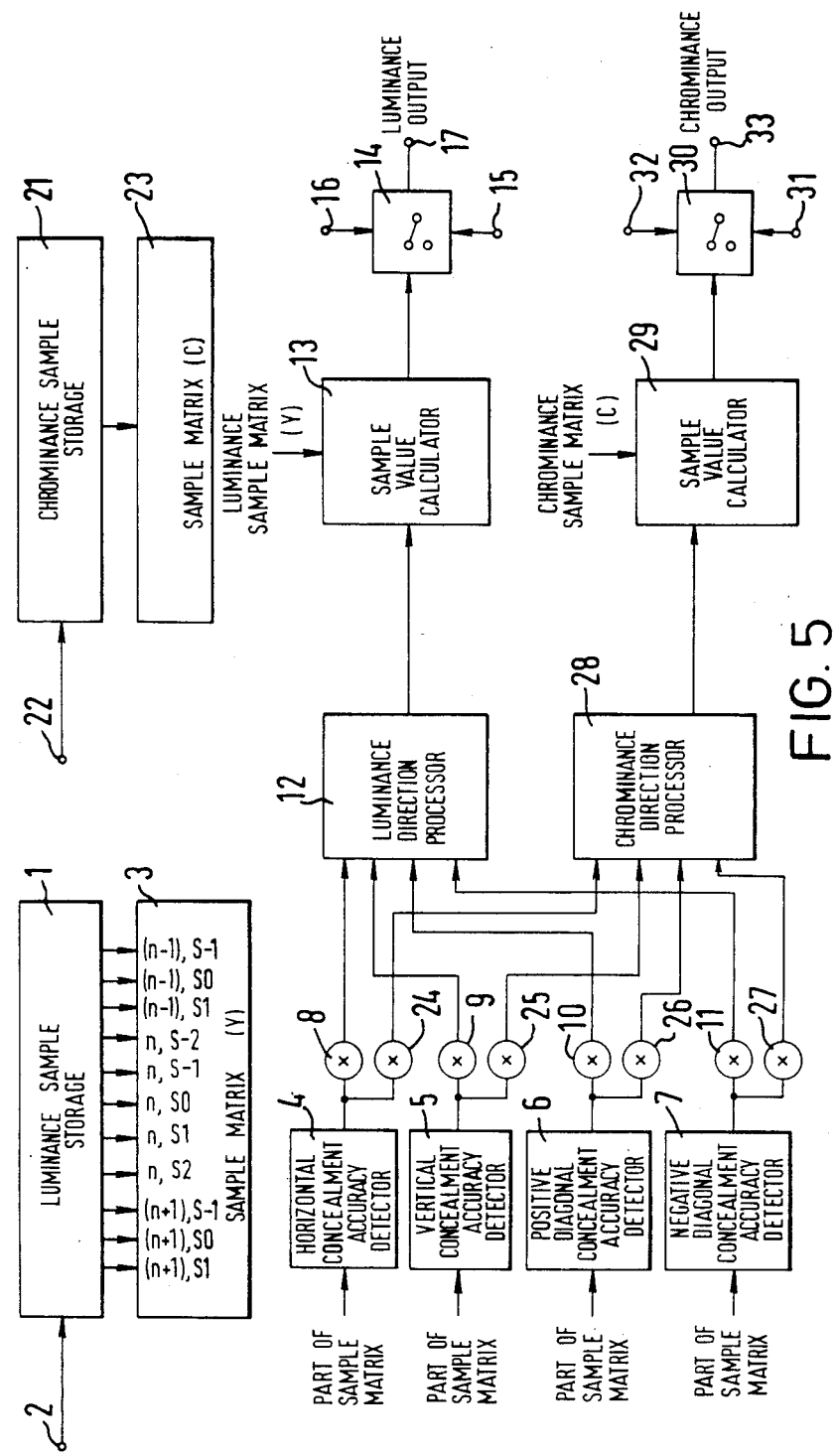
FIG. 5 shows in simplified block form an embodiment of apparatus for concealing errors in a digital of all the possible phases of the signals at the sample positions.

Referring to FIG. 5, this shows apparatus in accordance with the present invention for concealing errors in a digital television signal. The apparatus comprises a luminance sample storage means 1 to which the luminance input samples are supplied by way of an input terminal 2. The luminance sample storage means 1 supplies outputs of a luminance sample matrix storage means 3 which stores a moving matrix of sample values corresponding to the sample positions:

(n−1), S−1; (n−1), S0; (n−1), S1; n, S−2; n, S−1;
n, S0; n, S1; n, S2; (n+1), S−1; (n+1), S0; (n+1), S1.

Four concealment accuracy detectors are provided, these being a horizontal concealment accuracy detector 4, a vertical concealment accuracy detector 5, a positive diagonal concealment accuracy detector 6 and a negative diagonal concealment accuracy detector 7. Each of the concealment accuracy detectors 4 to 7 is continuously supplied with the appropriate part of the sample matrix from the luminance sample matrix storage means 3. Thus the horizontal concealment accuracy detector 4, for example, receives or selects the sample values necessary to calculate the concealment accuracy H using the algorithm (5) above, and supplies a signal representing the concealment accuracy H by way of a weighting multiplier 8 to a luminance direction processor 12. Likewise the concealment accuracy detectors 5 to 7 supply a respective signal representing the vertical concealment accuracy V using the algorithm (6) above, the positive diagonal concealment accuracy D+ using the algorithm (7) above, and the negative diagonal concealment accuracy D− using the algorithm (8) above, by way of weighting multipliers 9, 10 and 11 respectively to the luminance direction processor 12. The weighting multipliers 8 to 11 effect the weighting referred to above to compensate for the different distances between adjacent sample positions in the various directions. The weighting may be done simply on the basis of distance between adjacent sample positions, in which case each weighting multiplier multiplies by the distance between adjacent sample positions in the relevant direction. Other weightings can, however, be used.

The luminance direction processor 12 supplies an output signal representing the selected direction of concealment to a sample value calculator 13 which operates to select the appropriate samples from the luminance sample matrix storage means 3 and calculate therefrom the required concealment value to be used to conceal the error sample. For example, if the horizontal direction is selected, the sample value calculator 13 uses the sample values for the sample positions n, S−1 and n, S1 to calculate the value to be used to conceal the error sample at the sample position n, S0. The concealment value is supplied to a selector 14 to which a switching signal is supplied by way of a terminal 15. The selector 14 is also supplied with the sample value from the sample position n, S0 by way of a terminal 16.

Preferably the apparatus as so far described operates continuously, that is to say concealment values are determined as described for every sample position and supplied to the selector 14. Only, however, when it has been determined that there is an error at a given sample position n, S0, is a signal supplied to the selector 14 by way of the terminal 15, whereupon the concealment value supplied from the calculator 13 is supplied to a luminance output terminal 17 in place of the sample value supplied by way of the terminal 16. At all other times, the sample value supplied by way of the terminal 16 is supplied to the luminance output terminal 17.

The fact that there is an error at a given position n, S0 can be determined in any suitable manner. For example, it may be determined that the data word representing the sample value is not valid, or the data words may be grouped into error-detecting blocks for recording and an error-detecting code such as a cyclic redundancy check code associated with each block.

The apparatus may also include arrangements for calculating concealment values for the colour difference channels U and V. For simplicity, only that part of the apparatus necessary to calculate concealment values for the difference channel U is shown and will be described. For this purpose the apparatus comprises a chrominance sample storage means 21 to which chrominance input samples are supplied by way of an input terminal 22. The chrominance sample storage means 21 supplies outputs to a chrominance signal matrix storage means 23 which stores a moving matrix of sample values corresponding to those listed above in connection with the luminance sample matrix storage means 3, but adjusted to take account of the different spacing between adjacent chrominance samples.

Operating in time division multiplex for the luminance and chrominance samples respectively, the concealment accuracy detectors 4 to 7 derive signals representing the horizontal, vertical, positive diagonal and negative diagonal concealment accuracies H, V, D+ and D− using the algorithms (5) to (8) respectively for the chrominance difference channel U and supply the signals by way of respective chrominance weighting multipliers 24, 25, 26 and 27 to a chrominance direction processor 28 which supplies an output signal representing the selected direction of concealment to a sample value calculator 29 which operates to select the appropriate samples from the chrominance sample matrix storage means 23 and calculate therefrom the required concealment value to be used to conceal the error sample. The concealment error is supplied to a selector 30 to which a switching signal is supplied by way of a terminal 31. The selector 30 is also supplied with the sample value from the sample position n, S0 by way of a terminal 32.

As with the luminance part of the apparatus, the chorminance part of the apparatus preferably operates continuously. Only, however, when it has been determined there is an error at a given sample position n, S0, is a signal supplied to the selector 30 by way of the terminal 31, whereupon the concealment value supplied from the calculator 29 is supplied to a chrominance output terminal 33 in place of the sample value supplied by way of the terminal 32.

The chrominance part of apparatus may be duplicated for the colour difference channel V or alternatively hardware can be saved by also using the direction selected for the colour difference channel U for the colour difference channel V.

The method described works well so long as the average number of error samples over the field is not more than approximately 25%. If the error rate goes higher than this, as it may well do for example when using special reproduction modes such as slow or fast motion, the resulting increase in the density of error samples increases the probability of there being more than one error sample within the sample space from which sample values are used for calculating the concealment accuracies.

This problem can be alleviated in a modified method in which no direction of concealment is used if the calculation of the corrected value involves the use of an error sample.

However, it is not necessary to exclude a direction of concealment merely because the concealment accuracy H, V, D+ or D− as set out in the algorithms (5), (6), (7) or (8) involves the use of one or more error samples. Thus if, for example, the algorithm (5) used for calculating the horizontal concealment accuracy H is considered, it is seen that the algorithm can be viewed as the sum of four component algorithms respectively bounded by the magnitude signs, and it is possible for up to three of these four component algorithms to be invalidated by error samples, while the other component algorithm remains valid. Thus up to three of the component algorithms may be dropped in favour of the other component algorithm or algorithms in appropriate cases.

In other words, the algorithm (5) for calculating the horizontal concealment accuracy H can be split into four algorithms which can be separately used for calculating component concealment accuracies H1 to H4, as follows:

$$H1 = |(n-1), S-1-(n-1), S0| \tag{9}$$

$$H2 = |(n-1)S0-(n-1)S1| \tag{10}$$

$$H3 = |(n+1)S-1-(n+1), S0| \tag{11}$$

$$H4 = |(n+1), S0-(n+1), S1| \tag{12}$$

Likewise the algorithms (6), (7) and (8) can each be split into four component algorithms V1, V2, V3 and V4; D+1, D+2, D+3 and D+4; and D−1, D−2, D−3 and D−4, respectively, as follows $$V1 = |(n-1), S-1-n, S-1| \tag{13}$$

$$V2 = |n, S-1-(n+1), S-1| \tag{14}$$

$$V3 = |(n-1), S1-n, S1| \tag{15}$$

$$V4 = |n, S1-(n+1), S1| \tag{16}$$

$$D^+1 = |(n-1), S-1-n, S-2| \quad (17)$$

$$D^+2 = |(n-1), S0-n, S-1| \quad (18)$$

$$D^+3 = |n, S1-(n+1), S0| \quad (19)$$

$$D^+4 = |n, S2-(n+1), S1| \quad (20)$$

$$D^-1 = |(n-1), S0-n, S1| \quad (21)$$

$$D^-2 = |(n-1), S1-n, S2| \quad (22)$$

$$D^-3 = |n, S-2-(n+1), S-1| \quad (23)$$

$$D^-4 = |n, S-1-(n+1), S0| \quad (24)$$

This modified method is implemented in practice by calculating from the sample values available each of the component concealment accuracies. For example, for the horizontal direction A the component concealment accuracies H1 to H4 are calculated, but if any one of the four calculations involves the use of an error sample then that component concealment accuracy H1, H2, H3 or H4 is rejected, and the averge taken of the remainder, with the resulting average then scaled in dependence on the number of component algorithms used. If none is rejected, that is if no error sample is used for either of the calculations, then the full horizontal concealment accuracy H is calculated from:

$$H = \tfrac{1}{4}(H1 + H2 + H3 + H4) \quad (25)$$

These calculations are performed continuously and are most conveniently performed in the concealment accuracy detectors 4 to 7 of the apparatus of FIG. 5.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of concealing an erroneous sample value of an erroneous sample in a digital television signal, said television signal comprising a plurality of valid sample values of valid samples corresponding respectively to sample positions of a television picture, said erroneous sample value occurring at an intersection of lines that are defined by said sample positions and that respectively extend in horizontal, vertical, positive diagonal and negative diagonal directions, the method comprising:

calculating a first concealment accuracy by determining the difference between two immediately adjacent valid sample values both in a horizontal line immediately preceding or following said erroneous sample, and one of which valid samples is immediately adjacent to said erroneous sample;

calculating a second concealment accuracy by determining the difference between two immediately adjacent valid sample values both in a vertical line immediately preceding or following said erroneous sample, and one of which valid samples is immediately adjacent to said erroneous sample;

selecting a preferred one of said horizontal and vertical directions for concealing said erroneous sample;

calculating a corrected sample value of said erroneous sample using sample values disposed along said preferred direction; and substituting said corrected sample value for said erroneous sample value.

2. A method of concealing an erroneous sample value of an erroneous sample in a digital television signal, said television signal comprising a plurality of valid sample values of valid samples corresponding respectively to sample positions of a television picture, said erroneous sample value occurring at an intersection of lines that are defined by said sample positions and that respectively extend in horizontal, vertical, positive diagonal and negative diagonal directions, the method comprising:

calculating a first concealment accuracy by determining the difference between two immediately adjacent valid sample values both in a horizontal line immediately preceding or following said erroneous sample, and one of which valid samples is immediately adjacent to said erroneous sample;

calculating a second concealment accuracy by determining the difference between two immediately adjacent valid samples values both in a vertical line immediately preceding or following said erroneous sample, and one of which valid samples is immediately adjacent to said erroneous sample;

calculating a third concealment accuracy by determining the difference between two valid sample values disposed immediately adjacent to one another in the positive diagonal direction and one of which valid sample values corresponds to a sample which is adjacent to and in the same horizontal line as said erroneous sample;

calculating a fourth concealment accuracy by determining the difference between two valid sample values disposed immediately adjacent to one another in the negative diagonal direction and one of which valid sample values corresponds to a sample which is adjacent to and in the same horizontal line as said erroneous sample;

selecting a preferred one of said horizontal, vertical, positive diagonal and negative diagonal directions for concealing said erroneous sample;

calculating a corrected sample value of said erroneous sample using sample values disposed along said preferred direction; and substituting said corrected sample value for said erroneous sample value;

3. A method according to claim 2 wherein first, second, third and fourth algorithms are used respectively to calculate said four concealment accuracies which are designated H, V, D$^+$ and D$^-$ respectively, said algorithms being as follows:

$$H = \tfrac{1}{4}\{|(n-1), S-1-(n-1), S0| + |(n-1), S0-(n-1), S1| + |(n+1), S-1-(n+1), S0| + |(n+1), S0-(n+1), S1|\}$$

$$V = \tfrac{1}{4}\{|(n-1), S-1-n, S-1| + |n, S-1-(n+1), S-1| + |(n-1), S1-n, S1| + |n, S1-(n+1), S1|\}$$

$$D^+ = \tfrac{1}{4}\{|(n-1), S-1-n, S-2| + |(n-1), S0-n, S-1| + |n, S1-(n+1), S0| + |n, S2-(n+1), S1|\}$$

$$D^- = \tfrac{1}{4}\{|(n-1), S0-n, S1| + |(n-1), S1-n,\\ S2| + |n, S-2-(n+1), S-1| + |n, S-1-(n+1),\\ S0|\}$$

where n, S0 represents a sample value at a sample position S0 in a horizontal line n.

4. A method according to claim 2 wherein sixteen algorithms are used respectivvely to calculate sixteen concealment accuracies H1, H2, H3, H4, V1, V2, V3, V4, D+1, D+2, D+3, D+4, D−1, D−2, D−3 and D−4 respectively, said algorithms being as follows:

$$H1 = |(n-1), S-1-(n-1), S0|$$

$$H2 = |(n-1) S0-(n-1), S1|$$

$$H3 = |(n+1)S-1-(n+1), S0|$$

$$H4 = |(n+1), S0-(n+1), S1|$$

$$V1 = |(n-1), S-1-n, S-1|$$

$$V2 = |n, S-1-(n+1), S-1|$$

$$V3 = |(n-1), S1-n, S1|$$

$$V4 = |n, S1-(n+1), S1|$$

$$D^+1 = |(n-1), S-1-n, S-2|$$

$$D^+2 = |(n-), S0-n, S-1|$$

$$D^+3 = |n, S1,-(n+1), S0|$$

$$D^+4 = |n, S2-(n+1), S1$$

$$D^-1 = |(n-1), S0-n, S1|$$

$$D^-2 = |(n-1), S1-n, S2|$$

$$D^-3 = |n, S-2-(n+1), S-1|$$

$$D^-4 = |n, S-1-(n+1), S0|$$

where n, S0 represents a sample value at a sample position S0 in a horizontal line n;

any concealment accuracy in any of the four groups of concealment accuracies H1, H2, H3, H4; V1, V2, V3, V4; D+1, D+2, D+3, D+4; and D−1, D−2, D−3, D−4 which involves use of an erroneous sample is rejected; and said first, second, third and fourth concealment accuracies are derived by averaging and appropriately scaling these concealment accuracies in each of said groups not so rejected.

5. A method according to claim 2 wherein said concealment accuracies are each multiplied by a weighting factor corresponding to the distance between adjacent sample positions in the respective horizontal, vertical, positive diagonal and negative diagonal directions, and said preferred direction is then selected using the concealment accuracies after said weighting step.

6. Apparatus for concealing an erroneous sample value of an erroneous sample in a digital television signal, said television signal comprising a plurality of valid sample values of valid samples corresponding respectively to sample positions of a television picture, said erroneous sample value occurring at an intersection of lines that are defined by said sample positions and that respectively extend in horizontal, vertical, positive diagonal and negative diagonal directions, the apparatus comprising:

means for calculating a first concealment accuracy by determining the difference between two immediately adjacent valid sample values both in a horizontal line immediately preceding or following said erroneous sample, and one of which valid samples is immediately adjacent to said erroneous sample;

means for calculating a second concealment accuracy by determining the difference between two immediately adjacent valid sample values both in a vertical line immediately preceding or following said erroneous sample, and one of which valid samples is immediately adjacent to said erroneous sample;

means for selecting a preferred one of said horizontal and vertical directions for concealing said erroneous sample;

means for calculating a corrected sample value of said erroneous sample using sample values disposed along said preferred direction; and means for substituting said corrected sample value for said erroneous sample value.

7. Apparatus for concealing an erroneous sample value of an erroneous sample in a digital television signal, said television signal comprising a plurality of valid sample values of valid samples corresponding respectively to sample positions of a television picture, said erroneous sample value occurring at an intersection of lines that are defined by said sample positions and that respectively extend in horizontal, vertical, positive diagonal and negative diagonal directions, the apparatus comprising:

means for calculating a first concealment accuracy by determining the difference between two immediately adjacent valid sample values both in a horizontal line immediately preceding or following said erroneous sample, and one of which valid samples is immediately adjacent to said erroneous sample;

means for calculating a second concealment accuracy by determining the difference between two immediately adjacent valid sample values both in a vertical line immediately preceding or following said erroneous sample, and one of which valid samples is immediately adjacent to said erroneous sample;

means for calculating a third concealment accuracy by determining the difference between two valid sample values disposed immediately adjacent to one another in the positive diagonal direction and one of which valid sample values corresponds to a valid sample which is adjacent to and in the same horizontal line as said erroneous sample;

means for calculating a fourth concealment accuracy by determining the difference between two valid sample values disposed immediately adjacent to one another in the negative diagonal direction and one of which valid sample values corresponds to a sample which is adjacent to and in the same horizontal line as said erroneous sample;

means for selecting a preferred one of said horizontal, vertical, positive diagonal and negative diagonal directions for concealing said erroneous sample;

means for calculating a corrected sample value of said erroneous sample using sample values disposed along said preferred direction; and means for substituting said corrected sample value for said erroneous sample value.

8. Apparatus according to claim 7 wherein first, second, third and fourth algorithms are used respectively to calculate said four concealment accuracies which are designated H, V, D$^+$ and D$^-$ respectively, said algorithms being as follows:

$$H = \tfrac{1}{4}\{|(n-1), S-1-(n-1), S0| + |(n-1), S0-(n-1), S1| + |(n+1), S-1-(n+1), S0| + |(n+1), S0-(n+1), S1|\}$$

$$V = \tfrac{1}{4}\{|(n-1), S-1-n, S-1| + |n, S-1-(n+1), S-1| + |(n-1), S1-n, S1| + |n, S1-(n+1), S1|\}$$

$$D^+ = \tfrac{1}{4}\{|(n-1), S-1-n, S-2| + |(n-1), S0-n, S-1| + |n, S1-(n+1, S0| + |n, S2-(n+1), S1|\}$$

$$D^- = \tfrac{1}{4}\{|(n-1), S0-n, S1| + |(n-1), S1-n, S2| + |n, S-2-(n+1), S-1| + |n, S-1-(n+1), S0|\}$$

where n, S0 represents a sample value at a sample position S0 in a horizontal line n.

9. Apparatus according to claim 7 wherein sixteen algorithms are used respectively to calculate sixteen concealment accuracies H1, H2, H3, H4, V1, V2, V3, V4, D$^+$1, D$^+$2, D$^+$3, D$^+$4, D$^-$1, D$^-$2, D$^-$3 and D$^-$4 respectively, said algorithms being as follows:

$$H1 = |(n-1), S-1-(n-1), S0|$$

$$H2 = |(n-1) S0-(n-1) S1|$$

$$H3 = |(n+1) S-1-(n+1), S0|$$

$$H4 = |(n+1), S0-(n+1), S1|$$

$$V1 = |(n-1), S-1-n, S-1|$$

$$V2 = |n, S-1-(n+1), S-1|$$

$$V3 = |(n-1), S1-n, S1|$$

$$V4 = |n, S1-(n+1), S1|$$

$$D^+1 = |(n-1), S-1-n, S-2|$$

$$D^+2 = |(n-1), S0-n, S-1|$$

$$D^+3 = |n, S1-(n+1), S0|$$

$$D^+4 = |n, S2-(n+1), S1|$$

$$D^-1 = |(n-1), S0-n, S1|$$

$$D^-2 = |(n-1), S1-n, S2|$$

$$D^-3 = |n, S-2-(n+1), S-1|$$

$$D^-4 = |n, S-1-(n+1), S0|$$

where n, S0 represents a sample value at a sample position S0 in a horizontal line n;
any concealment accuracy in any of the four groups of concealment accuracies H1, H2, H3, H4; V1, V2, V3, V4; D$^+$1, D$^+$2, D$^+$3, D$^+$4; and D$^-$1, D$^-$2, D$^-$3, D$^-$4 which involves use of an erroneous sample being rejected, and said first, second, third and fourth concealment accuracies being derived by averaging and appropriately scaling these concealment accuracies in each of said groups not so rejected.

10. Apparatus according to claim 7 and further comprising means for multiplying each said concealment accuracy by a weighting factor corresponding to the distance between adjacent sample positions in the respective horizontal, vertical, positive diagonal and negative diagonal directions, and said preferred direction is then selected using the concealment accuracies after said weighting step.

* * * * *